(12) United States Patent
Konttori et al.

(10) Patent No.: US 10,395,111 B2
(45) Date of Patent: Aug. 27, 2019

(54) GAZE-TRACKING SYSTEM AND METHOD

(71) Applicant: Varjo Technologies Oy, Helsinki (FI)

(72) Inventors: Urho Konttori, Helsinki (FI); Klaus Melakari, Oulu (FI); Thiyagarajan Manihatty Bojan, Espoo (FI); Ville Miettinen, Helsinki (FI)

(73) Assignee: VARJO TECHNOLOGIES OY, Helsinki (FI)

( * ) Notice: Subject to any disclaimer, the term of this patent is extended or adjusted under 35 U.S.C. 154(b) by 0 days.

(21) Appl. No.: 15/648,936

(22) Filed: Jul. 13, 2017

(65) Prior Publication Data

US 2019/0019023 A1 Jan. 17, 2019

Related U.S. Application Data

(63) Continuation-in-part of application No. 15/366,424, filed on Dec. 1, 2016, now Pat. No. 9,711,072.

(51) Int. Cl.
*G06K 9/00* (2006.01)
*G06K 9/20* (2006.01)
(Continued)

(52) U.S. Cl.
CPC ..... *G06K 9/00604* (2013.01); *G02B 27/0093* (2013.01); *G06K 9/2027* (2013.01); *G09G 3/003* (2013.01)

(58) Field of Classification Search
CPC .. G06K 9/00604; G06K 9/2027; G09G 3/003; G02B 27/0093
See application file for complete search history.

(56) References Cited

U.S. PATENT DOCUMENTS

| 931,683 A | 8/1909 | Cox | |
|---|---|---|---|
| 7,401,920 B1 * | 7/2008 | Kranz | A61B 3/113 351/209 |

(Continued)

FOREIGN PATENT DOCUMENTS

| EP | 1134491 A2 | 9/2001 |
|---|---|---|
| WO | 2013009414 A2 | 1/2013 |

OTHER PUBLICATIONS

Anjul Patney et al. "Perceptually-Based Foveated Virtual Reality," Retrieved at https://research.nvidia.com/ publication/perceptually-based-foveated-virtual-reality, dated Jul. 2016, 2 pages.

(Continued)

*Primary Examiner* — Aneeta Yodichkas
(74) *Attorney, Agent, or Firm* — Ziegler IP Law Group, LLC

(57) ABSTRACT

A gaze-tracking system for a head-mounted display apparatus includes a first set of illuminators for emitting light to illuminate a user's eye; at least one photo sensor for sensing reflections of the light from the user's eye; at least one actuator for moving at least one of: (i) the first set of illuminators, (ii) the at least one photo sensor; and a processor coupled with the first set of illuminators, the at least one photo sensor and the at least one actuator. The processor is configured to collect and process sensor data from the at least one photo sensor to detect a gaze direction of the user, and to control the at least one actuator to adjust, based upon the detected gaze direction, a position of the at least one of: (i) the first set of illuminators, (ii) the at least one photo sensor.

11 Claims, 5 Drawing Sheets

(51) Int. Cl.
    G02B 27/00        (2006.01)
    G09G 3/00         (2006.01)

(56)              References Cited

U.S. PATENT DOCUMENTS 7,872,635  B2     1/2011  Mitchell
    7,973,834  B2     7/2011  Yang
 2006/0077558  A1     4/2006  Urakawa et al.
 2013/0114850  A1     5/2013  Publicover et al.
 2013/0222235  A1*    8/2013  Abdollahi .......... G02B 27/0172
                                                          345/156
 2014/0375680  A1*   12/2014  Ackerman ............ G06T 19/006
                                                          345/633
 2015/0278576  A1    10/2015  Horesh et al.
 2016/0240013  A1     8/2016  Spitzer
 2016/0342840  A1    11/2016  Mullins et al.
 2017/0315367  A1*   11/2017  Maruyama ......... G02B 27/0172

OTHER PUBLICATIONS

International Search Report and Written Opinion of the International Searching Authority received for International Application No. PCT/FI2017/050823, dated Mar. 1, 2018, 14 pages.

* cited by examiner

GAZE-TRACKING SYSTEM AND METHOD

CROSS-REFERENCE TO RELATED APPLICATIONS

This application is a continuation-in-part of U.S. patent application Ser. No. 15/366,424, now U.S. Pat. No. 9,711,072, issued on 18 Jul. 2017, the disclosure for which is incorporated herein by reference to its entirety.

TECHNICAL FIELD

The present disclosure relates generally to display apparatuses; and more specifically, to gaze-tracking systems for use in head-mounted display apparatuses. Furthermore, the present disclosure also relates to methods of tracking a user's gaze via the aforementioned gaze-tracking systems.

BACKGROUND

In recent times, there has been a rapid increase in use of technologies such as virtual reality, augmented reality, and so forth, for presenting a simulated environment (or a virtual world) to a user. Typically, the user uses a device (for example, such as a virtual reality device, an augmented reality device, and the like) for experiencing such a simulated environment. Furthermore, in use, the user generally wears (namely, supports) the device on his/her head.

Nowadays, such devices often employ a technique such as gaze-tracking (namely, eye tracking) to determine a gaze direction of the user. Typically, the gaze-tracking is associated with determination of position of pupils of eyes of the user. Generally, an illumination source is employed for emitting light towards the user's eyes, and a camera is employed for capturing an image depicting the pupils of the user's eyes and reflection(s) of the emitted light from the user's eyes. In such an instance, the captured image is employed to determine the gaze direction of the user.

Examples of commonly used gaze-tracking techniques employed in the aforesaid devices include a bright-pupil tracking technique and a dark-pupil tracking technique. In the bright-pupil tracking technique, the illumination source and the camera are positioned coaxially with the gaze direction of the user's eye. In such an instance, the emitted light is substantially reflected from a retina of the user's eye towards the camera, thereby producing a bright pupil effect in the captured image of the user's eye. On the other hand, in the dark-pupil tracking technique, the illumination source and the camera are positioned at an angle that is offset from the gaze direction of the user. In such an instance, the emitted light is reflected away from the camera, thereby producing a dark pupil effect in the captured image of the user's eye.

However, there exist a number of limitations associated with implementations of the aforementioned gaze-tracking techniques. Firstly, the illumination source and the camera are required to have specific positions with respect to the user's eyes for accurate gaze tracking. Typically, in devices employing the dark-pupil tracking technique, the illumination source and/or the camera may be positioned near a periphery of the user's eyes, and consequently, may be substantially obstructed by the user's eyelids, eye lashes and so forth. Such obstructions reduce an accuracy of the gaze-tracking. Secondly, in some conventional techniques, a hot mirror is required to be arranged within the device to align the camera along a central gaze direction of the user. Such devices are made large in size so as to accommodate the hot mirror, and are prone to suboptimal gaze-tracking when the user's gaze direction is positioned away from the center of the user's eyes. Thirdly, existing gaze-tracking techniques do not compensate for changes in pupil shape as per an apparent shape of the user's eyes from different directions. Consequently, additional inaccuracies (for example, such as geometric aberrations, reflection artefacts, and the like) are introduced in the gaze-tracking.

Therefore, in light of the foregoing discussion, there exists a need to overcome the aforementioned drawbacks associated with conventional gaze-tracking techniques.

SUMMARY

The present disclosure seeks to provide a gaze-tracking system for use in a head-mounted display apparatus.

The present disclosure also seeks to provide a method of tracking a user's gaze, via such a gaze-tracking system.

The present disclosure seeks to provide a solution to the existing problem of a specific arrangement of gaze-tracking equipment with respect to eyes of a user, and inaccuracies in existing gaze-tracking techniques. An aim of the present disclosure is to provide a solution that overcomes at least partially the problems encountered in the prior art, and provides a robust and efficient gaze-tracking system that eliminates aforesaid inaccuracies in the existing gaze-tracking techniques.

In one aspect, an embodiment of the present disclosure provides a gaze-tracking system for use in a head-mounted display apparatus, the gaze-tracking system comprising:
a first set of illuminators for emitting light to illuminate a user's eye when the head-mounted display apparatus is worn by the user;
at least one photo sensor for sensing reflections of the light from the user's eye;
at least one actuator for moving at least one of:
  (i) the first set of illuminators,
  (ii) the at least one photo sensor; and
a processor coupled in communication with the first set of illuminators, the at least one photo sensor and the at least one actuator, wherein the processor is configured to collect sensor data from the at least one photo sensor and process the sensor data to detect a gaze direction of the user, and to control the at least one actuator to adjust, based upon the detected gaze direction of the user, a position of the at least one of:
  (i) the first set of illuminators,
  (ii) the at least one photo sensor.

In another aspect, an embodiment of the present disclosure provides a method of tracking a user's gaze, via a gaze-tracking system of a head-mounted display apparatus, the method comprising:
emitting light, via a first set of illuminators of the gaze-tracking system, to illuminate a user's eye when the head-mounted display apparatus is worn by the user;
sensing reflections of the light from the user's eye, via at least one photo sensor of the gaze-tracking system;
collecting sensor data from the at least one photo sensor and processing the sensor data to detect a gaze direction of the user; and
adjusting, based upon the detected gaze direction of the user, a position of at least one of:
  (i) the first set of illuminators,
  (ii) the at least one photo sensor,
wherein the adjusting is performed by controlling at least one actuator of the gaze-tracking system to move the at least one of:

(i) the first set of illuminators, (ii) the at least one photo sensor.

Embodiments of the present disclosure substantially eliminate or at least partially address the aforementioned problems in the prior art, and enable accurate and efficient tracking of a user's gaze.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein.

Moreover, those in the art will understand that the drawings are not to scale. Wherever possible, like elements have been indicated by identical numbers.

Figure 1:
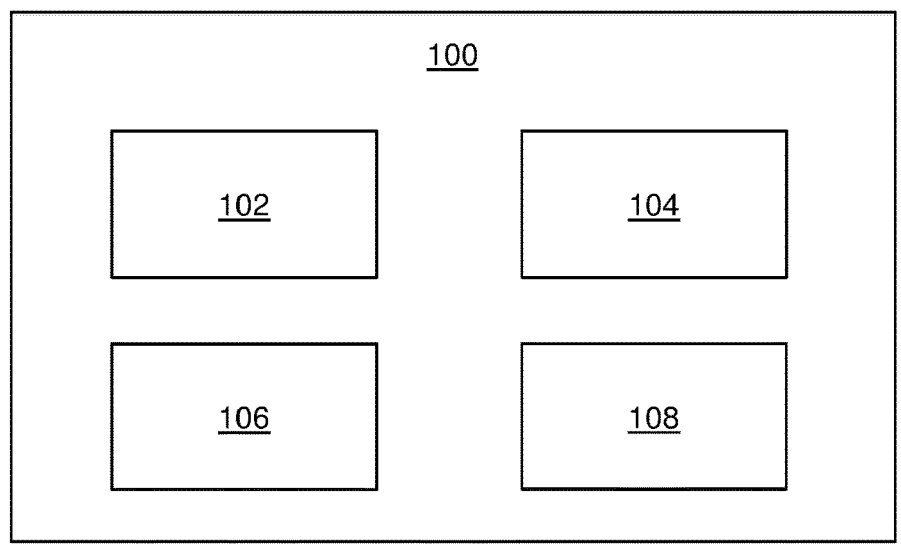
Figure 6:
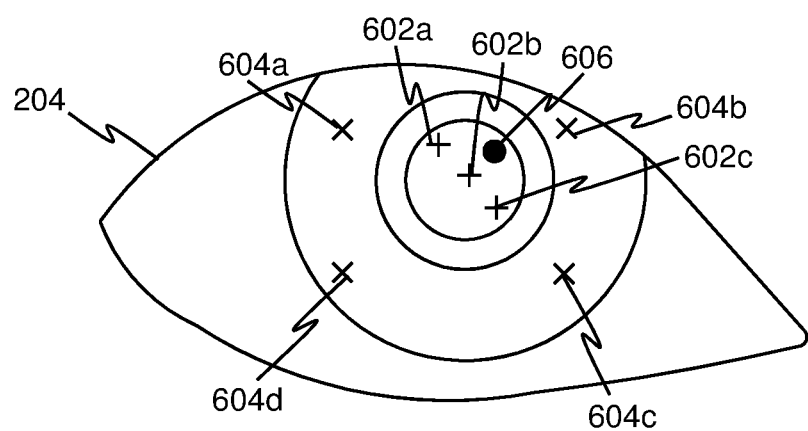
Figure 7:
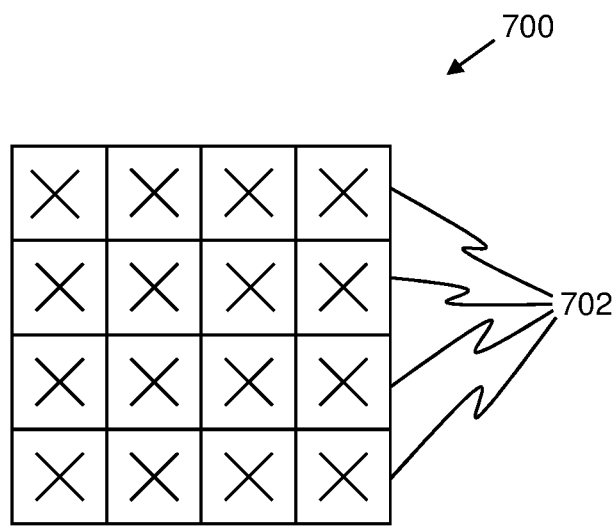
Figure 8:
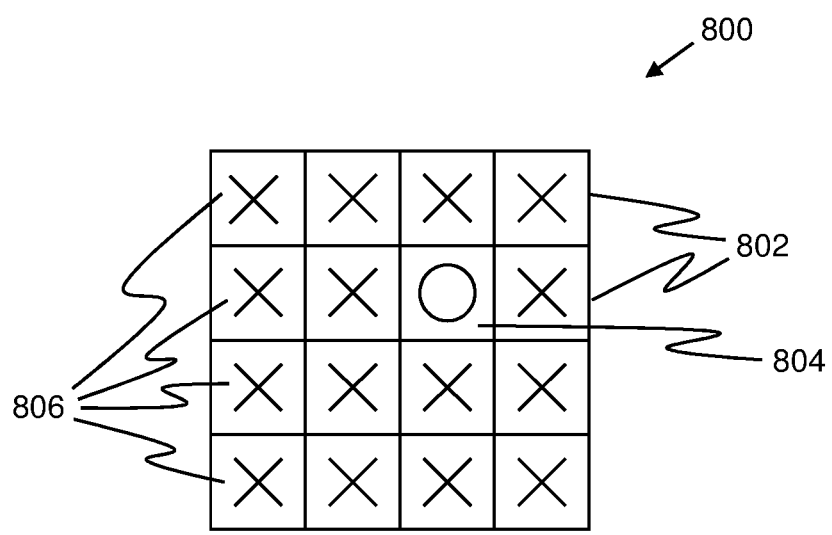
Figure 9:
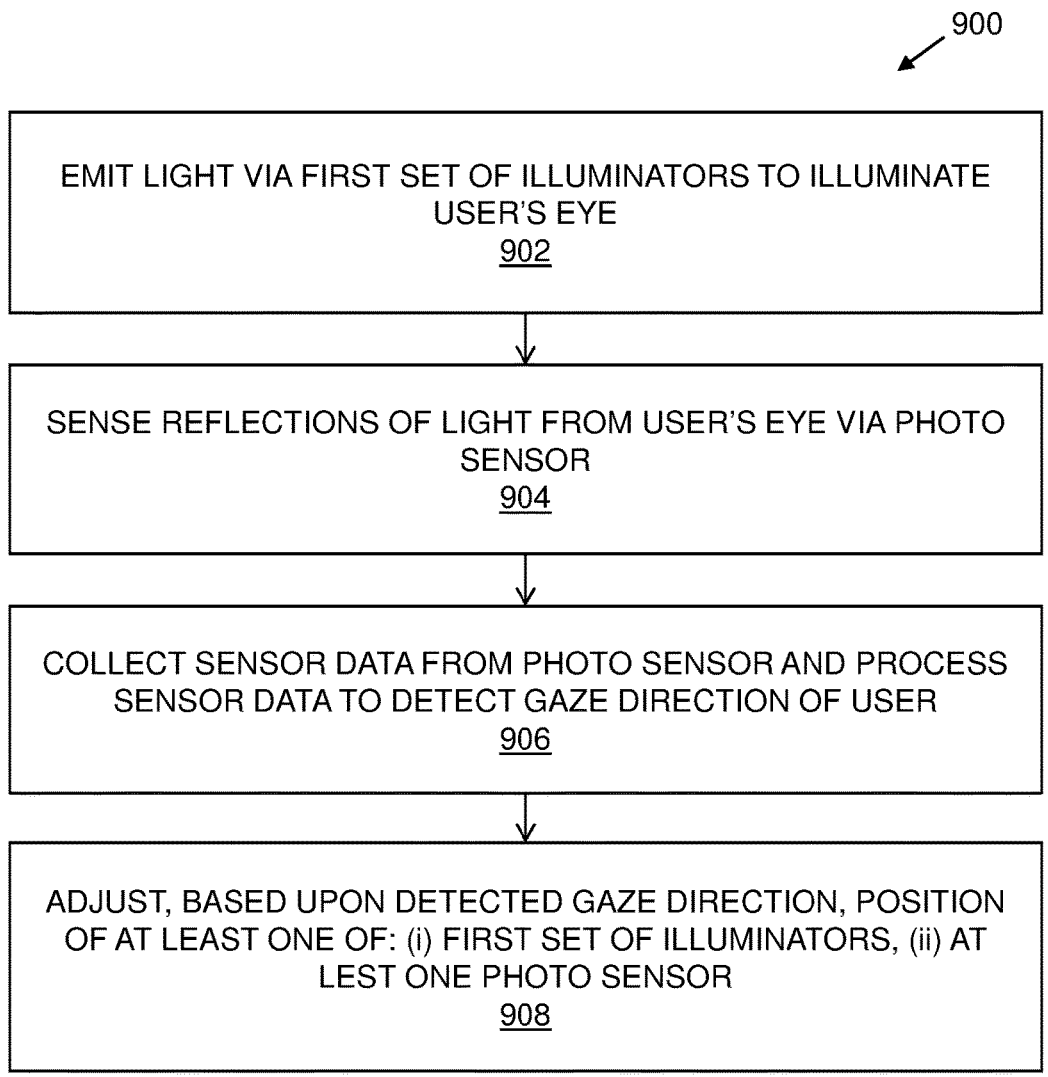

Embodiments of the present disclosure will now be described, by way of example only, with reference to the following diagrams wherein:

FIG. 1 illustrates a block diagram of a gaze-tracking system for use in a head-mounted display apparatus, in accordance with an embodiment of the present disclosure;

FIGS. 2, 3, 4, and 5 illustrate exemplary implementations of the gaze-tracking system in use within the head-mounted display apparatus, in accordance with various embodiments of the present disclosure;

FIG. 6 illustrates an exemplary image of a user's eye captured by a photo sensor (for example, such as a photo sensor of FIG. 2), in accordance with an embodiment of the present disclosure;

FIGS. 7 and 8 are schematic illustrations of an exemplary single chip, in accordance with different embodiments of the present disclosure; and FIG. 9 illustrates steps of a method of tracking a user's gaze via a gaze-tracking system of a head-mounted display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a gaze-tracking system for use in a head-mounted display apparatus, the gaze-tracking system comprising:

a first set of illuminators for emitting light to illuminate a user's eye when the head-mounted display apparatus is worn by the user;

at least one photo sensor for sensing reflections of the light from the user's eye;

at least one actuator for moving at least one of:
(i) the first set of illuminators,
(ii) the at least one photo sensor; and a processor coupled in communication with the first set of illuminators, the at least one photo sensor and the at least one actuator, wherein the processor is configured to collect sensor data from the at least one photo sensor and process the sensor data to detect a gaze direction of the user, and to control the at least one actuator to adjust, based upon the detected gaze direction of the user, a position of the at least one of:
(i) the first set of illuminators,
(ii) the at least one photo sensor.

In another aspect, an embodiment of the present disclosure provides a method of tracking a user's gaze, via a gaze-tracking system of a head-mounted display apparatus, the method comprising:

emitting light, via a first set of illuminators of the gaze-tracking system, to illuminate a user's eye when the head-mounted display apparatus is worn by the user;

sensing reflections of the light from the user's eye, via at least one photo sensor of the gaze-tracking system;

collecting sensor data from the at least one photo sensor and processing the sensor data to detect a gaze direction of the user; and adjusting, based upon the detected gaze direction of the user, a position of at least one of:
(i) the first set of illuminators,
(ii) the at least one photo sensor, wherein the adjusting is performed by controlling at least one actuator of the gaze-tracking system to move the at least one of:
(i) the first set of illuminators,
(ii) the at least one photo sensor.

The aforementioned gaze-tracking system and the aforementioned method of tracking the user's gaze employ adjustment of the position of the first set of illuminators, to allow for continual illumination of the user's eye, even in an event of a change in the gaze direction of the user. Beneficially, such adjustable positioning of the emitted light potentially reduces inaccuracies in gaze-tracking that are associated with obstruction of the emitted light by the user's eyelids, eye lashes and so forth. Moreover, the at least one actuator of the gaze-tracking system allows for an easy adjustment of the position of the first set of illuminators. Beneficially, a measure of movement of the at least one actuator (namely, associated with movement of the first set of illuminators) enhances an accuracy of the detected gaze direction of the user. Furthermore, the described gaze-tracking system allows for reduction in size and form factor thereof. The method described herein accurately determines the gaze direction of the user and beneficially compensates for changes in pupil shape based on an apparent shape of the user's eyes from different directions.

Throughout the present disclosure, the term "head-mounted display apparatus" used herein relates to specialized equipment that is configured to display an image to a user of the head-mounted display apparatus when the head-mounted display apparatus is worn by the user on his/her head. In such an instance, the head-mounted display apparatus is operable to act as a device (for example, such as a virtual reality headset, an augmented reality headset, a pair of virtual reality glasses, a pair of augmented reality glasses, and so forth) for presenting the image to the user.

According to an embodiment, the term "image" used herein relates to a representation of a virtual scene of a simulated environment (for example, a virtual reality environment) to be displayed via the head-mounted display apparatus. The image is presented to the user of the head-mounted display apparatus (for example, such as a virtual reality headset, a pair of virtual reality glasses, and the like). More specifically, the image is projected onto eyes of the user of the head-mounted display apparatus.

According to another embodiment, the term "image" used herein relates to an image of at least one virtual object. Examples of the at least one virtual object include, but are not limited to, a virtual navigation tool, a virtual gadget, a virtual message, a virtual entity, and a virtual medium. In such an instance, the at least one virtual object is overlaid on a projection of a real world image to constitute a visual scene of a resultant simulated environment (for example, an augmented reality environment). Throughout the present disclosure, the term "real world image" used herein relates to an image depicting actual surroundings of the user whereat he/she is positioned. Optionally, the head-mounted display apparatus comprises at least one camera to capture the real world image. More optionally, the head-mounted display apparatus further comprises at least one optical equipment to implement aforesaid overlaying operation and to project the resultant simulated environment onto the eyes of the user of the head-mounted display apparatus (for example, such as, an augmented reality headset, a pair of augmented reality glasses, and the like).

According to yet another embodiment, the term "image" used herein relates to a pictorial representation (namely, a visual perception) of a subject. Examples of the subject include, but are not limited to, an object, a person, a map, a painting, a graphical diagram, and text. Optionally, the image is a two-dimensional representation of the subject.

Optionally, the head-mounted display apparatus comprises an image source for rendering the image. More optionally, the image source relates to equipment configured to facilitate rendering of the image. Optionally, the image source comprises a context image renderer for rendering a context image and a focus image renderer for rendering a focus image, wherein a projection of the rendered context image and a projection of the rendered focus image together form a projection of the image. In such a case, the image comprises the context image and the focus image. Therefore, the context and focus images are rendered in order to collectively constitute the rendered image at the image source. It will be appreciated that the context image relates to a wide image of the virtual scene and/or the at least one virtual object, to be rendered and projected via the head-mounted display apparatus. Furthermore, the focus image relates to another image depicting a part (namely, a portion) of the virtual scene and/or the at least one virtual object, to be rendered and projected via the head-mounted display apparatus. Moreover, the focus image is dimensionally smaller the context image.

Optionally, an angular width of the projection of the rendered context image ranges from 40 degrees to 220 degrees, whereas an angular width of the projection of the rendered focus image ranges from 5 degrees to 60 degrees. In such an instance, the angular width of the projection of the rendered context image may be, for example, from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees, whereas the angular width of the projection of the rendered focus image may be, for example, from 5, 10, 15, 20, 25, 30, 35, 40, 45 or 50 degrees up to 15, 20, 25, 30, 35, 40, 45, 50, 55 or 60 degrees.

Throughout the present disclosure, the term "angular width" refers to an angular width of a given projection as seen from the user's eyes, when the head-mounted display apparatus is worn by the user. It will be appreciated that optionally, the angular width of the projection of the rendered context image is greater than the angular width of the projection of the rendered focus image since the rendered focus image is typically projected on and around the fovea of the user's eyes, whereas the rendered context image is projected upon the retina of the user's eyes.

Throughout the present disclosure, the term "context image renderer" used herein relates to equipment configured to facilitate rendering of the context image. Similarly, the term "focus image renderer" used herein relates to equipment configured to facilitate rendering of the focus image.

In an embodiment, the context image renderer and/or the focus image renderer are implemented by way of at least one projector and a projection screen associated therewith. Optionally, a single projection screen may be shared between the at least one projector employed to implement the context image renderer and the focus image renderer. In another embodiment, the context image renderer is implemented by way of at least one context display configured to emit the projection of the rendered context image therefrom, and the focus image renderer is implemented by way of at least one focus display configured to emit the projection of the rendered focus image therefrom.

Furthermore, optionally, the head-mounted display apparatus comprises at least one optical combiner for combining the projection of the rendered context image with the projection of the rendered focus image to create the image.

Throughout the present disclosure, the term "gaze-tracking system" used herein relates to specialized equipment for detecting a direction of gaze (namely, a gaze direction) of the user. The head-mounted display apparatus uses the gaze-tracking system for determining aforesaid gaze direction via non-invasive techniques. Beneficially, an accurate detection of the gaze direction facilitates the head-mounted display apparatus to closely implement gaze contingency thereon. As an example, the gaze-tracking system may be employed to detect the gaze direction of the user's eye, for projecting the rendered focus image on and around the fovea of the user's eye and for projecting the rendered context image on a retina of the user's eye, of which the fovea is just a small part. Therefore, even upon a change in the gaze direction (namely, due to a movement of the user's eye), the rendered focus image is projected on and around the fovea and the rendered context image is projected on the retina, for implementing active foveation in the head-mounted display apparatus.

It is to be understood that the gaze-tracking system may also be referred to as an "eye-tracker system" or a "gaze-tracking unit".

As mentioned previously, the first set of illuminators of the gaze-tracking system is employed to emit light to illuminate the user's eye when the head-mounted display apparatus is worn by the user. Optionally, the first set of illuminators is operable to illuminate one or both of the eyes of the user. More optionally, an intensity of the light emitted by the first set of illuminators is adjustable.

Throughout the present disclosure, the term "first set of illuminators" used herein relates to at least one light source configured to emit light of a specific wavelength. Optionally, the first set of illuminators is configured to emit light of infrared or near-infrared wavelength. The light of infrared or near-infrared wavelength is invisible to the human eye, thereby, reducing unwanted distraction when such light is incident upon the user's eye. Alternatively, optionally, the first set of illuminators is configured to emit light of visible wavelength.

Optionally, the at least one light source of the first set of illuminators is implemented by way of at least one of: infrared light emitting diodes, infrared lasers, infrared light projectors, visible light emitting diodes, visible light lasers, visible light projectors.

Optionally, in operation, the first set of illuminators emits the light in a direction that is at a predefined angle to a view direction of the user's eye, and wherein the gaze-tracking system further comprises at least one first optical element for reflecting the light emitted by the first set of illuminators towards the user's eye. In such a case, the at least one first optical element is positioned on an optical path of the emitted light, namely between the first set of illuminators and the user's eye. Alternatively, optionally, the first set of illuminators is operable to directly emit the light onto the user's eye.

It will be appreciated that the first set of illuminators are optionally arranged for illuminating the user's eye so as to facilitate both bright-pupil tracking and dark-pupil tracking. Furthermore, for implementing the bright-pupil tracking, the light emitted by the first set of illuminators is arranged to be incident upon the user's eye substantially along the view direction of the user's eye. Moreover, for implementing the dark-pupil tracking, the light emitted by the first set of illuminators is arranged to be incident upon the user's eye substantially away from (namely, offset from) the view direction of the user's eye.

More optionally, the predefined angle may be selected so as to reduce a size of the gaze-tracking system. In an embodiment, the predefined angle ranges from 120 degrees to 240 degrees. In such an instance, the predefined angle may be, for example, such as 120, 130, 140, 150, 160, 170, 180, 190, 200, 210, 220, 230, or 240 degrees with respect to the view direction of the user's eye. In another embodiment, the predefined angle is lesser than 120 degrees (for example, such as 90, 95, 100, 105, 110, or 115 degrees) or greater than 240 degrees (for example, such as 245, 250, 255, 260, 265, or 270 degrees).

Throughout the present disclosure, the term "at least one first optical element" used herein relates to an optical device that is configured to alter an optical path of the light emitted by the first set of illuminators. Optionally, the at least one first optical element is configured to implement specular reflection of the emitted light towards the user's eye.

Additionally, optionally, the at least one first optical element is configured to optically combine the projections of the rendered context and focus images to constitute the projection of the image. Optionally, in this regard, the at least one first optical element is arranged for any one of:
allowing the projection of the rendered context image to pass through substantially, whilst reflecting the projection of the rendered focus image substantially towards the user's eye,
allowing the projection of the rendered focus image to pass through substantially, whilst reflecting the projection of the rendered context image substantially towards the user's eye,
allowing the projection of the rendered context image and the projection of rendered focus image to pass through substantially, or
reflecting the projection of the rendered context image and the projection of rendered focus image substantially towards the user's eye.

Optionally, the projection of the image is dynamically repositionable and/or refocusable.

Optionally, the at least one first optical element is implemented by way of at least one of: a semi-transparent mirror, a semi-transparent reflector, a prism, a polarizer. As an example, the semi-transparent mirror for implementing the first optical element may be a pellicle mirror. In an embodiment, the at least one first optical element is flat (namely, planar) in shape. In another embodiment, the at least one first optical element is curved in shape. In yet another embodiment, the at least one first optical element is freeform in shape.

In such a case, optionally, the freeform shape is implemented as a combination of flat and curved surfaces including protrusions and depressions on a surface of the at least one first optical element.

As mentioned previously, the at least one photo sensor of the gaze-tracking system is employed to sense reflections of the light from the user's eye. Specifically, the light emitted from the first set of illuminators, upon being incident on the user's eye, are reflected therefrom. Furthermore, such sensing of the reflections of the light facilitate detection of the gaze direction of the user in the gaze-tracking system.

Throughout the present disclosure, the term "at least one photo sensor" used herein relates to equipment that is operable to detect the light reflected from the user's eye and to constitute at least one image of the user's eye. The light emitted by the first set of illuminators is reflected from various components of the user's eye, wherein such components include, but are not limited to, the cornea of the eye, the lens of the eye, and the retina of the eye. Furthermore, such reflections of the emitted light are detected by the at least one photo sensor and are depicted by way of the at least one image of the user's eye.

In an embodiment, the at least one photo sensor is operable to detect specific wavelengths of light. Optionally, the at least one photo sensor is operable to detect reflections of infrared or near-infrared light emitted by the first set of illuminators. Additionally or alternatively, optionally, the at least one photo sensor is operable to detect reflections of visible light emitted by the first set of illuminators. Examples of the at least one photo sensor include, but are not limited to, a digital camera, a black-and-white camera, a Red-Green-Blue (RGB) camera, and an Infra-Red (IR) camera.

Optionally, the at least one photo sensor is positioned at a fixed location within the gaze-tracking system.

In an implementation, the first set of illuminators emits infrared light to illuminate the user's eye. Optionally, in such a case, the emitted light is reflected from an outer surface of the cornea of the user's eye, thereby constituting corneal reflections (namely, glints) in the user's eye. Optionally, in this regard, the at least one photo sensor is employed to detect such corneal reflections by capturing an image of the user's eye, wherein the captured image depicts such corneal reflections.

As mentioned previously, the at least one actuator of the gaze-tracking system is operable to move the at least one of: (i) the first set of illuminators, (ii) the at least one photo sensor. Optionally, in this regard, the first set of illuminators and/or the at least one photo sensor is attached to the at least one actuator. As an example, the first set of illuminators may be mounted on a first platform, and the at least one photo sensor may be mounted on a second platform, wherein the first platform and the second platform are attached to the at least one actuator. Moreover, optionally, such movement includes at least one of: displacement (namely, horizontally and/or vertically), rotation, and/or tilting of the at least one of: (i) the first set of illuminators, (ii) the at least one photo sensor.

In one implementation, the at least one actuator is operable to move the first set of illuminators. In another implementation, the at least one actuator is operable to move the at least one photo sensor. In yet another implementation, the at least one actuator is operable to move the first set of illuminators and the at least one photo sensor.

As mentioned previously, the processor of the gaze-tracking system is configured to collect the sensor data from the at least one photo sensor and process the sensor data to detect the gaze direction of the user.

Throughout the present disclosure, the term "sensor data" used herein relates to the at least one image of the user's eye as captured by the at least one photo sensor. Optionally, the at least one image of the user's eye depicts a pupil of the user's eye and the reflections of the light from the user's eye.

In an embodiment, the processor is implemented by way of hardware, software, firmware or a combination of these, suitable for controlling the operation of the gaze-tracking system. The processor is configured to control the operation of the gaze-tracking system so as to accurately detect the gaze direction of the user. Additionally, optionally, the processor is configured to control the image source to display (namely, project) the image onto the eyes of the user, even in an event of a change in the direction of the user's gaze (namely, due to movement of the user's eye).

Optionally, the sensor data is processed by employing at least one image processing algorithm. The at least one image processing algorithm is employed to detect the pupil of the user's eye and positions of the reflections of the light from the user's eye with respect to the pupil. Therefore, the at least one image processing algorithm is employed to analyze a relationship between the positions of the pupil of the user's eye and the reflections of the light, to accurately detect the gaze direction of the user. Furthermore, optionally, the at least on image processing algorithm is employed to analyze the aforesaid relationship across the entire sensor data. In such an instance, the image processing algorithm is optionally implemented for each image of the user's eye. It will be appreciated that a change in the relative positions of the pupil and the reflections of the light, as depicted within the at least one image, is indicative of a change in the gaze direction of the user.

For illustration purposes only, there will now be considered an example, wherein the sensor data includes two images X1 and X2 of the user's eye as captured by the at least one photo sensor. In this example, the image X1 may depict a position of a pupil of the user's eye to be at a center of the user's eye. Furthermore, in the image X1, a corneal reflection of the emitted light may be at a center of the pupil. Therefore, the processing of the image X1 may lead to detection of a first gaze direction of the user to be along a central axis of the user's eye. However, in the example, the image X2 may depict a position of the pupil of the user's eye, to be at a top edge of the user's eye. Furthermore, in the image X2, the corneal reflection of the emitted light may be at a lower portion of the pupil. Therefore, the processing of the image X2 may lead to detection of a second gaze direction of the user to be along an axis that passes through the top region of the user's eye. In such a case, by analyzing a change in the relative positions of the corneal reflections and the pupil of the eye, as depicted in the two images X1 and X2, a change in the gaze direction of the user may be detected.

As mentioned previously, the processor controls the at least one actuator to adjust, based upon the detected gaze direction of the user, the position of the at least one of: (i) the first set of illuminators, (ii) the at least one photo sensor. Optionally, the processor is configured to regulate a magnitude and/or a direction of movement of the at least one actuator according to the detected gaze direction of the user. It will be appreciated that an accuracy of the detected gaze direction of the user is enhanced when the magnitude and/or the direction of movement of the at least one actuator is regulated according to the detected gaze direction. Furthermore, the at least one actuator allows for movement of the at least one of: (i) the first set of illuminators, (ii) the at least one photo sensor, in accordance with a change in the gaze direction of the user. Consequently, the user's gaze is tracked efficiently, and accurately.

Optionally, the processor controls the at least one actuator by generating an actuation signal. Examples of such actuation signal include, but are not limited to, an electric current, a hydraulic pressure, and a mechanical force. As an example, a vertical displacement of the at least one actuator by one centimeter may be implemented for an upward shift of 0.1 centimeter in the detected gaze of the user.

In one implementation, the processor controls the at least one actuator to adjust the position of the first set of illuminators, based upon the detected gaze direction of the user. Furthermore, such adjustment of the position (namely, movement) of the first set of illuminators is beneficially implemented in a manner that the light emitted by the first set of illuminators continues to illuminate the user's eye, even in an event of a change in the gaze direction of the user's eye. Beneficially, such adjustable positioning of the first set of illuminators enables reduction in inaccuracies in gaze-tracking that are associated with obstruction of the emitted light by the user's eyelids, eye lashes and so forth.

Optionally, such movement of the first set of illuminators changes the predefined angle between the direction in which the light is emitted therefrom and the view direction of the user's eye. Alternatively, optionally, such movement of the first set of illuminators is implemented in a manner that the predefined angle between the direction in which the light is emitted therefrom and the view direction of the user's eye remains constant.

In another implementation, the processor controls the at least one actuator to adjust the position of the at least one photo sensor, based upon the detected gaze direction of the user. Furthermore, such adjustment of the position (namely, movement) of the at least one photo sensor is implemented in a manner that the positions of the reflections of the light from the user's eye remain substantially constant in relation to the at least one photo sensor. Optionally, in such a case, an optimal configuration of the gaze-tracking system relates to such relative constant relationship between the relative positions of the reflections of the light and the at least one photo sensor. However, in the event of a change in the gaze direction of the user's eye, the aforesaid optimal configuration is disturbed on a temporary basis, namely until the processor controls the at least one actuator to readjust the position of the at least one photo sensor. In such an instance, the processor is configured to employ the at least one image processing algorithm to calculate a deviation between the sensor data (namely, the at least one image of the user's eye)

captured after the change in the gaze direction with regard to the aforesaid optimal configuration. Consequently, the processor is configured to control the at least one actuator to adjust the position of the at least one photo sensor, to maintain the optimal configuration.

In yet another implementation, the processor controls the at least one actuator to adjust the position of the first set of illuminators and the at least one photo sensor, based upon the detected gaze direction of the user. Beneficially, such adjustment of the position (namely, movement) of the first set of illuminators and the at least one photo sensor allows for continual illumination of the user's eye and substantially constant positioning of the reflections of the light in relation to the at least one photo sensor, even in the event of the change in the gaze direction of the user's eye.

Optionally, the at least one actuator comprises at least one first actuator and at least one second actuator, wherein the at least one first actuator and the at least one second actuator are employed to adjust the positions of the first set of illuminators and the at least one photo sensor, respectively, according to the detected gaze direction of the user.

Optionally, the at least one photo sensor is implemented by way of a plurality of photo-sensitive pixels. Optionally, the plurality of photo-sensitive pixels are to be employed to render the aforementioned image. In such an instance, the plurality of photo-sensitive pixels possess both a rendering functionality and a photo-sensing functionality. Therefore, the plurality of photo-sensitive pixels are operable to implement either or both of the rendering functionality and the photo-sensing functionality. Furthermore, optionally, the image rendered by the plurality of photo-sensitive pixels is the aforementioned focus image. In such an instance, the at least one photo sensor is arranged to operate as the focus image renderer, and the plurality of photo-sensitive pixels of the at least one photo sensor constitute the focus display. Moreover, optionally, an angular width of a projection of the rendered image (namely, the focus image) ranges from 5 degrees to 60 degrees.

Optionally, the processor is configured to control the plurality of photo-sensitive pixels to operate the rendering functionality and the photo-sensing functionality of the plurality of photo-sensitive pixels in a non-overlapping manner. In an embodiment, the processor operates (namely, operationally switches) the plurality of photo-sensitive pixels in a manner that at a given time instant, the plurality of photo-sensitive pixels provide only one of the rendering functionality and the photo-sensing functionality. In another embodiment, the processor operates the plurality of photo-sensitive pixels in a manner that at a given time instant, the plurality of photo-sensitive pixels provide both of the rendering functionality and the photo-sensing functionality, such that the rendered image is not sensed thereby.

Furthermore, optionally, the plurality of photo-sensitive pixels are integrated into a single chip. In such an instance, the single chip comprises a plurality of elements wherein the plurality of photo-sensitive pixels are implemented by way of the plurality of elements. Therefore, optionally, in such an instance, the plurality of photo-sensitive pixels (of the single chip) possess both the aforementioned rendering functionality and the aforementioned photo-sensing functionality. Furthermore, optionally, the plurality of elements of the single chip are arranged in a grid-like manner.

Optionally, in the gaze-tracking system, the first set of illuminators and the at least one photo sensor are integrated into the single chip. Optionally, in this regard, the single chip comprises the plurality of elements, wherein the first set of illuminators is implemented by way of a first fraction of the plurality of elements and the at least one photo sensor is implemented by way of a second fraction of the plurality of elements. Furthermore, optionally, the plurality of elements of the single chip are arranged in a grid-like manner.

Optionally, the second fraction of the plurality of elements that implements the at least one photo sensor is lesser than the first fraction of the plurality of elements that implements the first set of illuminators. Furthermore, optionally, the second fraction of the plurality of elements is sparsely dispersed throughout the single chip. As an example, the single chip may comprise 1,048,576 elements. In such a case, the 1,048,576 elements may be arranged in a 1024× 1024 grid. Furthermore, in the example, $1/16^{th}$ of the plurality of elements (namely, 65,536 elements) may implement the at least one photo sensor and $15/16^{th}$ of the plurality of elements (namely, 983,040 elements) may implement the first set of illuminators. It will be appreciated that the aforesaid integration enables the single chip to provide a light-emitting functionality and the photo-sensing functionality simultaneously, due to provision of different functional elements (namely, the first set of illuminators and the at least one photo sensor) for providing different functionalities.

Additionally, optionally, the focus image renderer is integrated in the single chip. In such an instance, the focus image renderer is implemented by way of a third fraction of the plurality of elements of the single chip. Therefore, in such an instance, the single chip beneficially provides the rendering functionality, the light-emitting functionality, and the photo-sensing functionality, as and when required.

Moreover, optionally, the focus image renderer is movable. Optionally, when the focus image renderer is integrated in the single chip, the focus image render is moved by the at least one actuator. As a result, the projection of the focus image is beneficially directed towards the fovea of the user's eye, such that it follows the gaze direction of the user.

Optionally, the gaze-tracking system further comprises a second set of illuminators for emitting light to illuminate the user's eye when the head-mounted display apparatus is worn by the user, wherein the second set of illuminators is positioned at a fixed location. Optionally, the second set of illuminators is employed to emit the light in the direction that is at the predefined angle to the view direction of the user's eye, wherein the at least one first optical element reflects the light emitted by the second set of illuminators towards the user's eye. Additionally or alternatively, optionally, the second set of illuminators is employed to emit the light onto the user's eye directly.

Optionally, the head-mounted display apparatus further comprises a processor coupled in communication with the gaze-tracking system, wherein the processor of the head-mounted display apparatus is configured to:
(a) receive the detected gaze direction of the user from the gaze-tracking system;
(b) receive the image to be displayed to the user of the head-mounted display apparatus, and use the detected gaze direction of the user to determine a region of visual accuracy of the image;
(c) process the image to generate the context image and the focus image, the context image having a first resolution and the focus image having a second resolution, wherein:
a region of the context image that substantially corresponds to the region of visual accuracy of the input image is masked,
the focus image substantially corresponds to the region of visual accuracy of the input image, and
the second resolution is higher than the first resolution; and (d) render the context image at the context image renderer and the focus image at the focus image renderer substantially simultaneously, whist controlling the at least one optical combiner to combine the projection of the rendered context image with the projection of the rendered focus image in a manner that the projection of the rendered focus image substantially overlaps the projection of the masked region of the rendered context image. Optionally, in this regard, the image to be displayed to the user of the head-mounted display apparatus is received from an imaging device and/or a memory unit communicably coupled to the head-mounted display apparatus. Furthermore, it is to be understood that the term "region of visual accuracy" used herein relates to a region of the image whereat the detected gaze direction of the user is directed (namely, focused) when the user of the head-mounted display apparatus views the image. Therefore, the region of visual accuracy is a fixation region within the image.

Furthermore, optionally, the second resolution (of the focus image) is higher than the first resolution (of the context image) since the rendered focus image is typically projected by the head-mounted display apparatus on and around the fovea of the user's eyes, whereas the rendered context image is projected by the head-mounted display apparatus upon the retina of the user's eyes. Such resolution of the focus and context images allow for emulating visual characteristics of the human visual system when the image is viewed by the user of the head-mounted display apparatus.

Moreover, optionally, the region of visual accuracy of the image is represented within both the rendered context image of low resolution and the rendered focus image of high resolution. Moreover, the rendered focus image having a high resolution may include more information pertaining to the region of visual accuracy of the image, as compared to the rendered context image having a low resolution. Therefore, it will be appreciated that the processor optionally masks the region of the context image that substantially corresponds to the region of visual accuracy of the image in order to avoid optical distortion of the region of visual accuracy of the image, when the projection of the focus image is combined with the projection of the rendered context image.

Moreover, optionally, at least one of: (i) the context image renderer, (ii) the focus image renderer, (iii) the at least one optical combiner are movable for adjusting at least one of: the projection of the rendered context image, the projection of the renderer focus image, in a desired manner. Optionally, in this regard, the head-mounted display apparatus comprises an actuation arrangement for implementing the aforesaid movement. More optionally, such movement includes least one of: displacement (horizontally and/or vertically), rotation, tilting, of the at least one of: (i) the context image renderer, (ii) the focus image renderer, (iii) the at least one optical combiner. For example, the actuation arrangement comprises two actuators for moving the context image renderer and the focus image renderer.

Optionally, the head-mounted display apparatus comprises a lens (for example, such as an enlarging lens) positioned in the optical path of the projection of the rendered context image and/or the projection of the rendered focus image, to ensure desired size and/or desired optical path thereof. Optionally, in this regard, the lens is positioned on the optical path of the light emitted by the first set of illuminators. As an example, a lens (for example, such as a plano-convex lens) may be positioned on the optical path of the projections of the rendered context and focus images, and the optical path of the light emitted by the first set of illuminators.

Therefore, optionally, use of the gaze-tracking system within the head-mounted display apparatus allows for implementing active foveation (namely, gaze-contingency) within the head-mounted display apparatus. Therefore, such a head-mounted display apparatus closely emulates visual characteristics of the human visual system.

Optionally, the head-mounted display apparatus comprises at least one camera configured to capture at least one image of the gaze-tracking system, wherein the at least one camera is coupled in communication with the processor of the gaze-tracking system.

Furthermore, the at least one image of the gaze-tracking system depicts arrangement (namely, positions) of components (namely, the first set of illuminators, the at least one photo sensor, the at least one actuator, and the like) of the gaze-tracking system. In such an instance, the at least one image is employed for historical monitoring of the aforesaid arrangement of the components, wherein such historical monitoring facilitates movement of the components to achieve a previous optimal arrangement, or in other words, reclaim a previous lost arrangement of the gaze-tracking system.

The present disclosure also relates to the method as described above. Various embodiments and variants disclosed above apply mutatis mutandis to the method.

DETAILED DESCRIPTION OF THE DRAWINGS

Referring to FIG. 1, illustrated is a block diagram of a gaze-tracking system 100 for use in a head-mounted display apparatus (not shown), in accordance with an embodiment of the present disclosure. The gaze-tracking system 100 comprises a first set of illuminators 102 for emitting light to illuminate a user's eye when the head-mounted display apparatus is worn by the user; at least one photo sensor 104 for sensing reflections of the light from the user's eye; at least one actuator 106 for moving at least one of: (i) the first set of illuminators 102, (ii) the at least one photo sensor 104; and a processor 108 coupled in communication with the first set of illuminators 102, the at least one photo sensor 104 and the at least one actuator 106. The processor 108 is configured to collect sensor data from the at least one photo sensor 104 and process the sensor data to detect a gaze direction of the user, and to control the at least one actuator 106 to adjust, based upon the detected gaze direction of the user, a position of the at least one of: (i) the first set of illuminators 102, (ii) the at least one photo sensor. In an example, the first set of illuminators 102 is configured to emit light of infrared or near-infrared wavelength.

Referring to FIGS. 2, 3, 4, and 5, illustrated are exemplary implementations of a (for example, such as the gaze-tracking system 100 shown in FIG. 1) in use within a head-mounted display apparatus (not shown), in accordance with various embodiments of the present disclosure. It may be understood by a person skilled in the art that the FIGS. 2, 3, 4 and 5 include simplified arrangements for implementation of the gaze-tracking system for sake of clarity, which should not unduly limit the scope of the claims herein. The person skilled in the art will recognize many variations, alternatives, and modifications of embodiments of the present disclosure.

Figure 2:
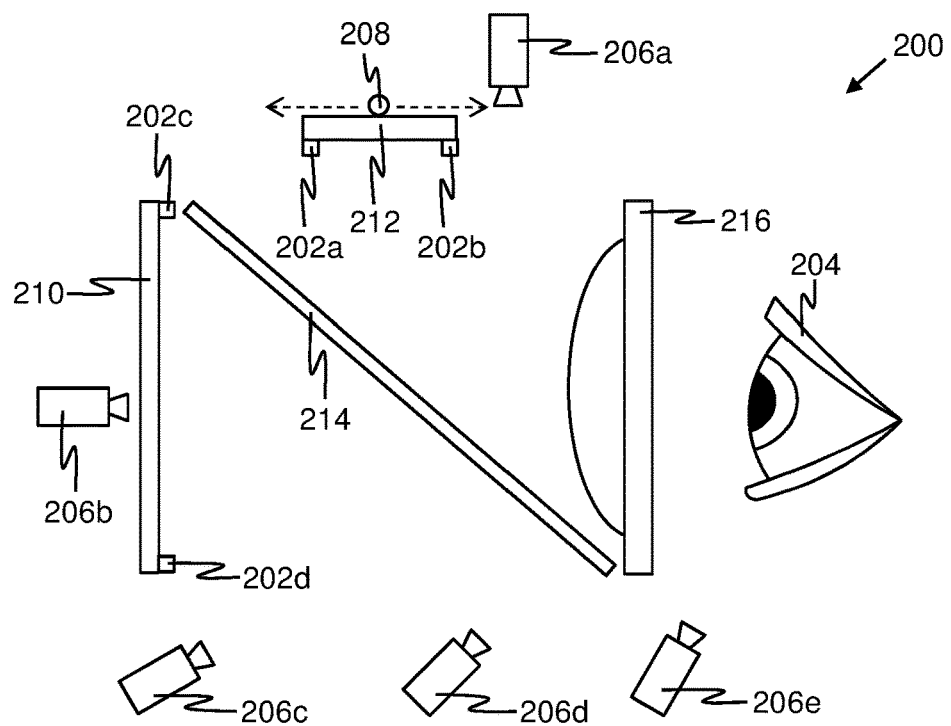

Referring to FIG. 2, illustrated is an exemplary implementation of a gaze-tracking system 200 (such as the gaze-tracking system 100 of FIG. 1) in use within a head-mounted display apparatus, in accordance with an embodiment of the present disclosure. The gaze-tracking system 200 comprises a first set of illuminators 202*a-b* for emitting light to illuminate a user's eye 204, at least one photo sensor 206*a-e* for sensing reflections of the light from the user's eye 204, at least one actuator 208 for moving the first set of illuminators 202*a-b*, and a processor (not shown) coupled in communication with the first set of illuminators 202*a-b*, the at least one photo sensor 206*a-e*, and the at least one actuator 208. Additionally, optionally, the head-mounted display apparatus comprises a context image renderer implemented by way of a context display 210 for rendering a context image and a focus image renderer implemented by way of a focus display 212 for rendering a focus image. Furthermore, as shown, the first set of illuminators 202*a-b* is attached to the focus display 212. Therefore, the at least one actuator 208 is configured to move the focus display 212 for moving the first set of illuminators 202*a-b*. In the exemplary gaze-tracking system 200, the first set of illuminators 202*a-b* emits light in a direction that is at a predefined angle to a view direction of the user's eye 204. In such an instance, the gaze-tracking system 200 further comprises at least one first optical element 214 for reflecting the light emitted by the first set of illuminators 202*a-b* towards the user's eye 204. Moreover, the exemplary gaze-tracking system 200 further comprises a second set of illuminators 202*c-d* for emitting light to illuminate the user's eye 204, wherein the second set of illuminators 202*c-d* is positioned at a fixed location. As shown, the second set of illuminators 202*c-d* is attached to the context display 210. Furthermore, optionally, the head-mounted display apparatus includes a lens 216 positioned on an optical path of the light emitted by the first set of illuminators 202*a-b*, the light emitted by the second set of illuminators 202*c-d*, and projections of the context and focus images.

Figure 3:
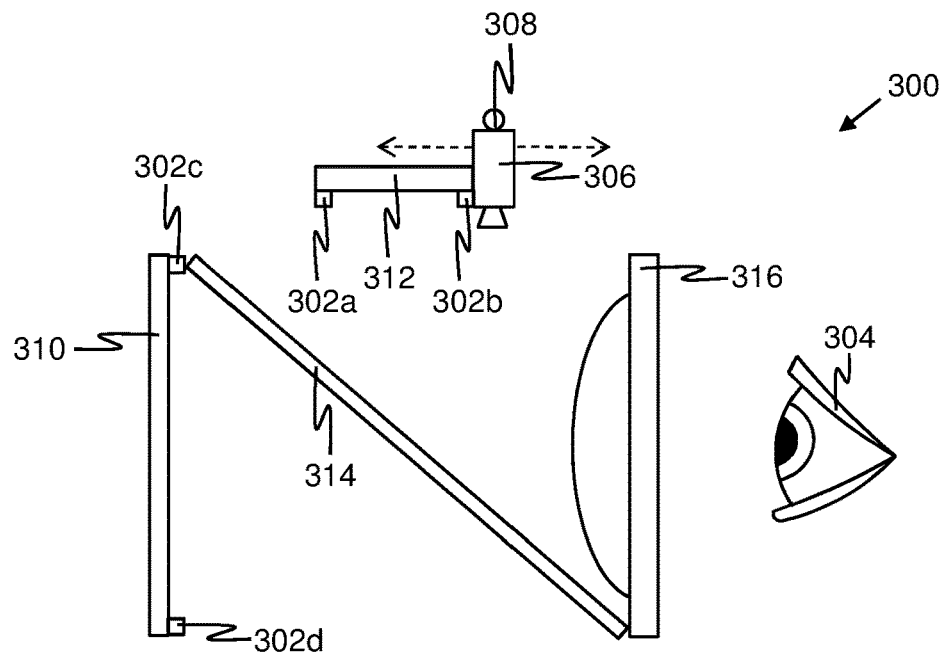

Referring to FIG. 3, illustrated is another exemplary implementation of a gaze-tracking system 300 (such as the gaze-tracking system 100 of FIG. 1) in use within a head-mounted display apparatus, in accordance with another embodiment of the present disclosure. The gaze-tracking system 300 comprises a first set of illuminators 302*a-b* for emitting light to illuminate a user's eye 304, at least one photo sensor 306 for sensing reflections of the light from the user's eye 304, at least one actuator 308 for moving the at least one photo sensor 306, and a processor (not shown) coupled in communication with the first set of illuminators 302*a-b*, the at least one photo sensor 306, and the at least one actuator 308. The processor is configured to control the at least one actuator 308 to adjust, based upon the detected gaze direction of the user, a position of the at least one photo sensor 306. Additionally, optionally, the head-mounted display apparatus comprises a context image renderer implemented by way of a context display 310 for rendering a context image and a focus image renderer implemented by way of a focus display 312 for rendering a focus image. Furthermore, as shown, the first set of illuminators 302*a-b* is attached to the focus display 312. In the exemplary gaze-tracking system 300, the first set of illuminators 302*a-b* emits light in a direction that is at a predefined angle to a view direction of the user's eye 304. In such an instance, the gaze-tracking system 300 further comprises at least one first optical element 314 for reflecting the light emitted by the first set of illuminators 302*a-b* towards the user's eye 304. Moreover, the exemplary gaze-tracking system 300 further comprises a second set of illuminators 302*c-d* for emitting light to illuminate the user's eye 304, wherein the second set of illuminators 302*c-d* is positioned at a fixed location. As shown, the second set of illuminators 302*c-d* is fixed to the context display 310. Furthermore, optionally, the head-mounted display apparatus includes a lens 316 positioned on an optical path of the light emitted by the first set of illuminators 302*a-b*, the light emitted by the second set of illuminators 302*c-d*, and projections of the context and focus images.

Figure 4:
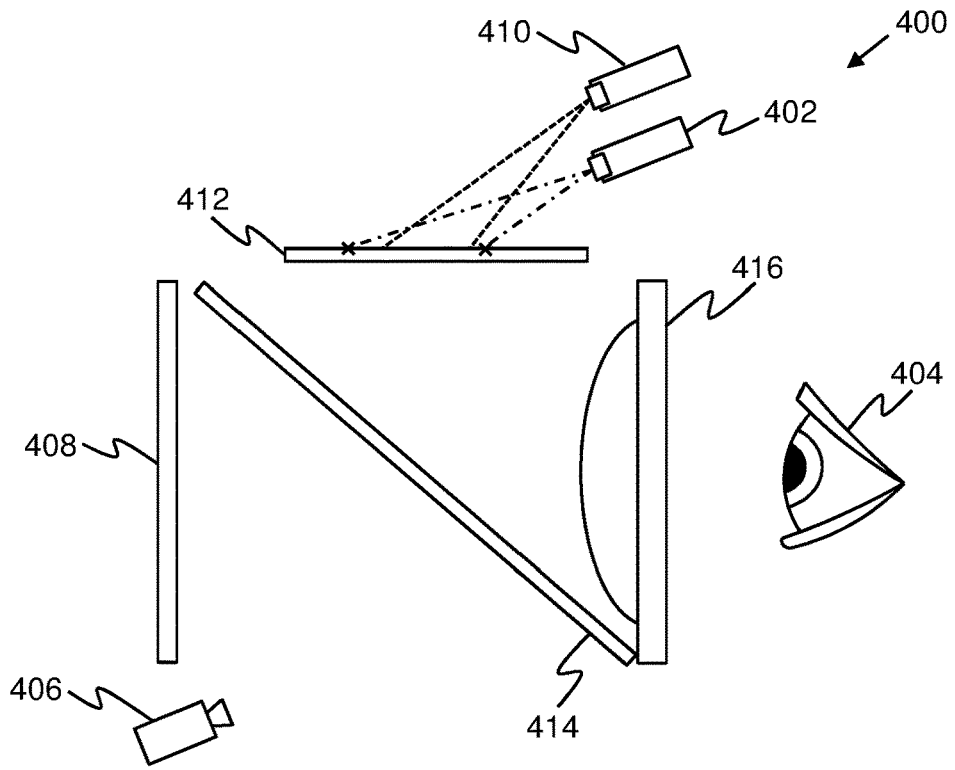

Referring to FIG. 4, an exemplary implementation of a gaze-tracking system 400 (such as the gaze-tracking system 100 of FIG. 1), in use within a head-mounted display apparatus, in accordance with another embodiment of the present disclosure. The gaze-tracking system 400 comprises a first set of illuminators, depicted as a light projector 402, for emitting light to illuminate a user's eye 404 when the head-mounted display apparatus is worn by the user; at least one photo sensor, depicted as a photo sensor 406, for sensing reflections of the light from the user's eye 404; at least one actuator (not shown) for moving at least one of: (i) the first set of illuminators 402, (ii) the at least one photo sensor 406; and a processor (not shown) coupled in communication with the first set of illuminators 402, the at least one photo sensor 406 and the at least one actuator. Optionally, the light projector 402 is implemented by way of an infrared light projector. Furthermore, optionally, the head-mounted display apparatus comprises a context image renderer implemented by way of a context display 408 for rendering a context image and a focus image renderer implemented by way of a projector 410 and a projection screen 412 associated therewith, for rendering a focus image. As shown, the projector 410 is configured to project the focus image onto the projection screen 412, depicted as dashed lines in FIG. 4. In the exemplary gaze-tracking system 400, the first set of illuminators 402 emits light in a direction that is at a predefined angle to a view direction of the user's eye 404, depicted as dash-dot lines in FIG. 4. In such an instance, the gaze-tracking system 400 further comprises at least one first optical element, depicted as a first optical element 414, for reflecting the light emitted by the first set of illuminators 402 towards the user's eye 404. Furthermore, the at least one first optical element 414 is optionally arranged for allowing a projection of the rendered context image to pass through substantially, whilst reflecting a projection of the rendered focus image substantially towards the user's eye 404. Therefore, in such an instance, optionally, use of the gaze-tracking system 400 within the head-mounted display apparatus allows for implementing active foveation (namely, gaze-contingency) within the head-mounted display apparatus. Furthermore, optionally, head-mounted display apparatus comprises a lens 416 positioned in the optical path of the projections of the rendered context and focus images, and an optical path of the light emitted by the first set of illuminators 402.

Figure 5:
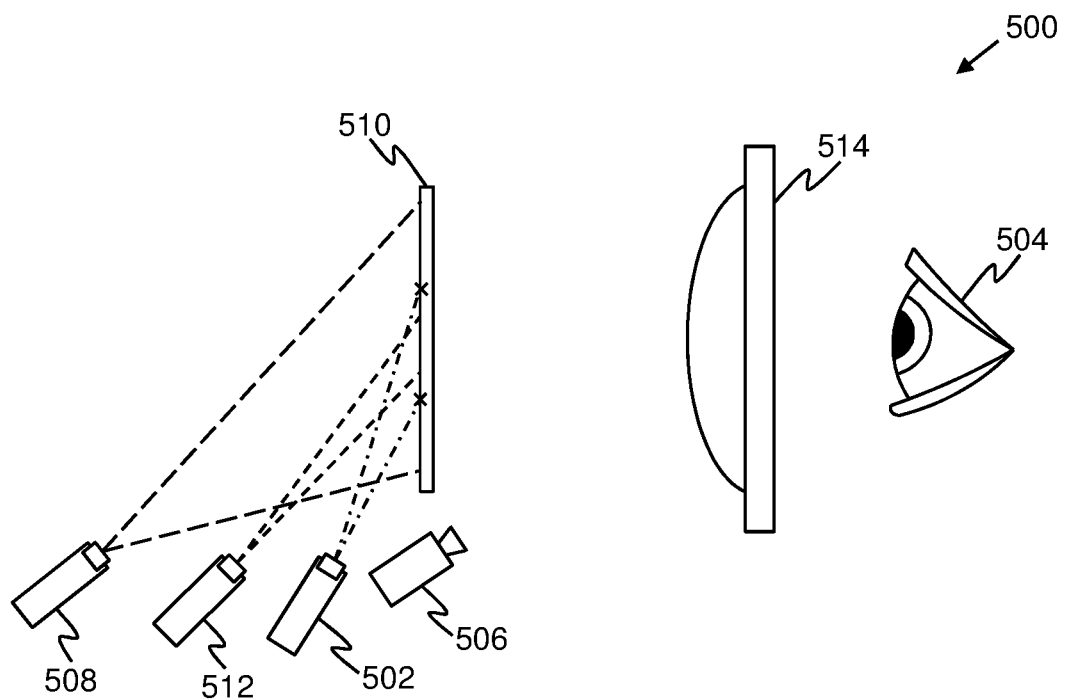

Referring to FIG. 5, an exemplary implementation of a gaze-tracking system 500 (such as the gaze-tracking system 100 of FIG. 1), in use within a head-mounted display apparatus, in accordance with another embodiment of the present disclosure. The gaze-tracking system 500 comprises a first set of illuminators, depicted as a light projector 502, for emitting light to illuminate a user's eye 504 when the head-mounted display apparatus is worn by the user; at least one photo sensor, depicted as a photo sensor 506, for sensing reflections of the light from the user's eye 504; at least one actuator (not shown) for moving at least one of: (i) the first set of illuminators 502, (ii) the at least one photo sensor 506; and a processor (not shown) coupled in communication with the first set of illuminators 502, the at least one photo sensor 506 and the at least one actuator. Optionally, the light projector 502 is implemented by way of an infrared light projector. Furthermore, optionally, the head-mounted display apparatus comprises a context image renderer implemented by way of a context projector 508 a projection screen 510 associated therewith for rendering a context image and a focus image renderer implemented by way of a projector 512 and the projection screen 510 associated therewith, for rendering a focus image. In such an instance, the projection screen 510 is shared between the projectors 508 and 512 employed to implement the context image renderer and the focus image renderer respectively. As shown, the projector 508 is configured to project the context image onto the projection screen 510, depicted as long-dashed lines in FIG. 5, and the projector 512 is configured to project the focus image onto the projection screen 510, depicted as short-dashed lines in FIG. 5. In the exemplary gaze-tracking system 500, the first set of illuminators 502 emits light in a direction that is at a predefined angle to a view direction of the user's eye 504, depicted as dash-dot lines in FIG. 5. Furthermore, optionally, use of the gaze-tracking system 500 within the head-mounted display apparatus allows for implementing active foveation (namely, gaze-contingency) within the head-mounted display apparatus. Moreover, optionally, head-mounted display apparatus comprises a lens 514 positioned in the optical path of the projections of the rendered context and focus images, and an optical path of the light emitted by the first set of illuminators 502.

Referring to FIG. 6, illustrated is an exemplary image of a user's eye (such as the user's eye 204 of FIG. 2) captured by a photo sensor (for example, such as the photo sensor 206b of FIG. 2), in accordance with an embodiment of the present disclosure. As shown, reflections of light emitted by the first set of illuminators 202a-b are depicted as symbols 602a-c. Furthermore, reflections of light emitted by the second set of illuminators 202c-d are depicted in the user's eye 204 as symbols 604a-d. Moreover, there is also depicted a glint 606 associated with reflection of light by cornea of the user's eye 204.

Referring to FIGS. 7 and 8, illustrated are schematic illustrations of an exemplary single chip, in accordance with different embodiments of the present disclosure. It may be understood by a person skilled in the art that the FIGS. 7 and 8 include simplified schematic illustrations of the exemplary single chip for sake of clarity, which should not unduly limit the scope of the claims herein. The person skilled in the art will recognize many variations, alternatives, and modifications of embodiments of the present disclosure.

Referring to FIG. 7, illustrated is a schematic illustration of an exemplary single chip 700, in accordance with an embodiment of the present disclosure. Optionally, the single chip 700 comprises a plurality of elements 702, optionally arranged in a grid-like manner. As shown, the single chip 700 of FIG. 7 comprises 16 elements arranged in a 4×4 grid. Optionally, a plurality of photo sensitive pixels, depicted as crosses (namely, as 'X'), are integrated into the single chip 700, wherein the plurality of photo sensitive pixels are implemented by way of the plurality of elements 702. The plurality of photo sensitive pixels are optionally employed to implement at least one photo sensor of a gaze-tracking system (for example, such as the gaze-tracking system 100 of FIG. 1). Optionally, the plurality of photo sensitive pixels possess both a rendering functionality and a photo-sensing functionality. For example, the plurality of photo sensitive pixels are employed to render a focus image.

Referring to FIG. 8, illustrated is a schematic illustration of an exemplary single chip 800 in accordance with another embodiment of the present disclosure. Optionally, the single chip 800 comprises a plurality of elements 802 arranged in a grid-like manner. As shown, the single chip 800 of FIG. 8 comprises 16 elements arranged in a 4×4 grid. Optionally, a first set of illuminators and at least one photo sensor are integrated into the single chip 800. Furthermore, optionally, the first set of illuminators is implemented by way of a first fraction of the plurality of elements 802, depicted as an element 804 (namely, as 'O') of the single chip 800. The at least one photo sensor is implemented by way of a second fraction of the plurality of elements 802, depicted as elements 806 (namely, as 'X's) of the single chip 800. For example, as shown in the single chip 800, the first set of illuminators is implemented by $1/16^{th}$ of the plurality of elements 802, and the at least one photo sensor is implemented by $15/16^{th}$ of the plurality of elements 802.

Referring to FIG. 9, illustrated are steps of a method 900 of tracking a user's gaze via a gaze-tracking system of a head-mounted display apparatus, in accordance with an embodiment of the present disclosure. At step 902, light is emitted via a first set of illuminators of a gaze-tracking system, to illuminate a user's eye when the head-mounted display apparatus is worn by the user. At step 904, reflections of the light from the user's eye are sensed via at least one photo sensor of the gaze-tracking system. At step 906, sensor data is collected from the at least one photo sensor and processed to detect a gaze direction of the user. At step 908, a position of at least one of: (i) the first set of illuminators, (ii) the at least one photo sensor is adjusted based upon the detected gaze direction of the user, wherein the adjusting is performed by controlling at least one actuator of the gaze-tracking system to move the at least one of: (i) the first set of illuminators, (ii) the at least one photo sensor.

The steps 902 to 908 are only illustrative and other alternatives can also be provided where one or more steps are added, one or more steps are removed, or one or more steps are provided in a different sequence without departing from the scope of the claims herein. For example, in operation, the light is emitted by the first set of illuminators in a direction that is substantially perpendicular to a view direction of the user's eye, and wherein the method 900 further comprises using at least one first optical element of the gaze-tracking system to reflect the light emitted by the first set of illuminators towards the user's eye. In yet another example, the at least one photo sensor is implemented by way of a plurality of photo-sensitive pixels, and wherein the method 900 further comprises employing the plurality of photo-sensitive pixels to render an image. In one example, the method 900 further comprises controlling the plurality of photo-sensitive pixels to operate a rendering functionality and a photo-sensing functionality of the plurality of photo-sensitive pixels in a non-overlapping manner. In another example, the method 900 further comprises emitting light, via a second set of illuminators of the gaze-tracking system, to illuminate the user's eye when the head-mounted display apparatus is worn by the user, wherein the second set of illuminators is positioned at a fixed location.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A gaze-tracking system for use in a head-mounted display apparatus, the gaze-tracking system comprising:
   a first set of illuminators for emitting infrared light at a predefined angle to a view direction of a user's eye;
   at least one first optical element for reflecting the infrared light emitted by the first set of illuminators towards the user's eye to illuminate the user's eye when the head-mounted display apparatus is worn by the user;
   at least one photo sensor for sensing positions of reflections of the infrared light emitted by the first set of illuminators from the user's eye in relation to the at least one photo sensor;
   at least one actuator for moving at least one of:
      (i) the first set of illuminators for emitting infrared light,
      (ii) the at least one photo sensor for sensing positions of reflections of the infrared light emitted by the first set of illuminators; and
   a processor coupled in communication with the first set of illuminators, the at least one photo sensor and the at least one actuator, wherein the processor is configured to collect sensor data from the at least one photo sensor and process the sensor data to detect a change in the gaze direction of the user, and to control the at least one actuator to adjust, based upon the detected change in the gaze direction of the user, a position of the at least one of:
      (i) the first set of illuminators to maintain the emitted infrared light at the predefined angle to the view direction of the user's eye,
      (ii) the at least one photo sensor to maintain the relative positions of the reflections of the infrared light emitted by the first set of illuminators from the user's eye and the at least one photo sensor.

2. The gaze-tracking system of claim 1, wherein the at least one first optical element is implemented by way of at least one of: a semi-transparent mirror, a semi-transparent reflector, a prism, a polarizer.

3. The gaze-tracking system of claim 1, wherein the first set of illuminators and the at least one photo sensor are integrated into a single chip.

4. The gaze-tracking system of claim 1, wherein the at least one photo sensor is implemented by way of a plurality of photo-sensitive pixels, and wherein the plurality of photo-sensitive pixels are to be employed to render an image.

5. The gaze-tracking system of claim 4, wherein an angular width of a projection of the rendered image ranges from 5 degrees to 60 degrees.

6. The gaze-tracking system of claim 4, wherein the processor is configured to control the plurality of photo-sensitive pixels to operate a rendering functionality and a photo-sensing functionality of the plurality of photo-sensitive pixels in a non-overlapping manner.

7. The gaze-tracking system of claim 1, further comprising a second set of illuminators for emitting light to illuminate the user's eye when the head-mounted display apparatus is worn by the user, wherein the second set of illuminators is positioned at a fixed location.

8. A method of tracking a user's gaze, via a gaze-tracking system of a head-mounted display apparatus, the method comprising:
   emitting infrared light, via a first set of illuminators of the gaze-tracking system, in a direction that is at a predefined angle to a view direction of a user's eye;
   using at least one first optical element of the gaze-tracking system to reflect the infrared light emitted by the first set of illuminators towards the user's eye to illuminate the user's eye when the head-mounted display apparatus is worn by the user;
   sensing positions of reflections of the infrared light emitted by the first set of illuminators from the user's eye in relation to at least one photo sensor of the gaze-tracking system, via the at least one photo sensor;
   collecting sensor data from the at least one photo sensor and processing the sensor data to detect a change in a gaze direction of the user; and
   adjusting, based upon the detected change in the gaze direction of the user, a position of at least one of:
      (i) the first set of illuminators for emitting infrared light,
      (ii) the at least one photo sensor for sensing positions of reflections of the infrared light emitted by the first set of illuminators,
   wherein the adjusting is performed by controlling at least one actuator of the gaze-tracking system to move the at least one of:
      (i) the first set of illuminators to maintain the emitted infrared light at the predefined angle to the view direction of the user's eye,
      (ii) the at least one photo sensor to maintain the relative positions of the reflections of the infrared light emitted by the first set of illuminators from the user's eye and the at least one photo sensor.

9. The method of claim 8, wherein the at least one photo sensor is implemented by way of a plurality of photo-sensitive pixels, and wherein the method further comprises employing the plurality of photo-sensitive pixels to render an image.

10. The method of claim 9, further comprising controlling the plurality of photo-sensitive pixels to operate a rendering functionality and a photo-sensing functionality of the plurality of photo-sensitive pixels in a non-overlapping manner.

11. The method of claim 8, further comprising emitting light, via a second set of illuminators of the gaze-tracking system, to illuminate the user's eye when the head-mounted display apparatus is worn by the user, wherein the second set of illuminators is positioned at a fixed location.

* * * * *